(12) United States Patent
Van Overschelde et al.

(10) Patent No.: US 9,992,935 B2
(45) Date of Patent: Jun. 12, 2018

(54) CROP HEADER STACKED DIVIDER PIVOT LINKAGE

(71) Applicant: CNH INDUSTRIAL AMERICA LLC, New Holland, PA (US)

(72) Inventors: Pieter Van Overschelde, Sint-Andries (BE); Sandor Van Vooren, Sijsele-Damme (BE); Yvan C. C. Vandergucht, Lo-Reninge (BE); Maarten Ysebaert, Tielt (BE)

(73) Assignee: CNH Industrial America LLC, New Holland, PA (US)

( * ) Notice: Subject to any disclaimer, the term of this patent is extended or adjusted under 35 U.S.C. 154(b) by 93 days.

(21) Appl. No.: 14/844,824

(22) Filed: Sep. 3, 2015

(65) Prior Publication Data
US 2016/0057933 A1    Mar. 3, 2016

(30) Foreign Application Priority Data

Sep. 3, 2014 (BE) .................................. 2014/0665

(51) Int. Cl.
*A01D 63/00* (2006.01)
*A01D 65/00* (2006.01)
*A01D 63/04* (2006.01)

(52) U.S. Cl.
CPC .................... *A01D 63/04* (2013.01)

(58) Field of Classification Search
CPC .... A01D 45/021; A01D 41/144; A01D 63/00; A01D 63/02; A01D 63/04; A01D 65/00
USPC ........................................................ 56/314
See application file for complete search history.

(56) References Cited

U.S. PATENT DOCUMENTS

| | | | |
|---|---|---|---|
| 703,497 A | | 7/1902 | Steward |
| 1,277,257 A | * | 8/1918 | Porterfield ............. A01D 63/04 56/314 |
| 4,214,422 A | * | 7/1980 | McMillen ............. A01D 57/00 56/119 |
| 4,232,747 A | | 11/1980 | Pfenninger et al. |
| 4,269,018 A | | 5/1981 | Pickett |
| 4,446,682 A | * | 5/1984 | Jennen ................. A01D 45/021 56/119 |
| 4,493,181 A | | 1/1985 | Glendenning et al. |

(Continued)

FOREIGN PATENT DOCUMENTS

| CH | 440802 A | 7/1967 |
|---|---|---|
| DE | 7342482 U | 3/1974 |

(Continued)

*Primary Examiner* — Arpad Fabian-Kovacs
(74) *Attorney, Agent, or Firm* — Peter K. Zacharias; Patrick M. Sheldrake

(57) ABSTRACT

A folding crop header having an articulated, elongate crop divider defining upper and lower crop divider edges and having first and second crop divider sections, the crop divider including at or adjacent a said lower crop divider edge a hinge permitting pivoting of the first and second crop divider sections relative to one another about a first axis; and the crop divider including a linkage permitting pivoting of the first and second crop divider sections relative to one another about a second axis at or adjacent the said upper crop divider edge; and additionally permitting displacement of the first and second crop divider sections relative to one another in a displacement direction that is skewed relative to the second axis, the hinge being decouplable.

9 Claims, 3 Drawing Sheets

(56) References Cited

U.S. PATENT DOCUMENTS

| | | | | |
|---|---|---|---|---|
| 4,538,404 A * | 9/1985 | Heimark, Jr. | A01D 45/021 | 56/119 |
| 4,700,537 A * | 10/1987 | Emmert | A01D 63/04 | 56/119 |
| 4,757,673 A * | 7/1988 | Gayman | A01D 63/04 | 172/502 |
| 5,845,472 A * | 12/1998 | Arnold | A01D 41/144 | 56/228 |
| 5,865,019 A * | 2/1999 | Hurlburt | A01D 45/021 | 56/118 |
| 5,910,092 A | 6/1999 | Bennett | | |
| 6,247,297 B1 * | 6/2001 | Becker | A01D 45/021 | 56/119 |
| 6,513,313 B1 * | 2/2003 | Bennett | A01D 45/021 | 56/119 |
| 7,162,855 B2 * | 1/2007 | Boeckmann | A01D 45/021 | 56/15.2 |
| 7,350,345 B2 * | 4/2008 | Slabbinck | A01D 63/00 | 56/119 |
| 7,395,651 B2 * | 7/2008 | Kost | A01D 45/021 | 56/119 |
| 7,681,387 B2 * | 3/2010 | Guldenpfennig | A01D 45/021 | 56/119 |
| 8,387,352 B2 * | 3/2013 | Silver | A01D 45/021 | 56/119 |
| 8,567,168 B2 * | 10/2013 | Allochis | A01D 63/02 | 56/109 |
| 8,640,434 B2 * | 2/2014 | Lohrentz | A01D 45/021 | 56/119 |
| 8,938,940 B2 * | 1/2015 | Mossman | A01D 63/04 | 56/314 |
| 9,032,700 B2 * | 5/2015 | Lohrentz | A01D 45/021 | 56/119 |
| 9,642,307 B2 * | 5/2017 | Long | A01D 45/021 | |
| 2003/0041579 A1 | 3/2003 | Wubbels et al. | | |
| 2003/0056482 A1 * | 3/2003 | Weichholdt | A01D 63/04 | 56/314 |
| 2004/0107684 A1 | 6/2004 | Slabbinck et al. | | |
| 2006/0174603 A1 | 8/2006 | Mossman | | |
| 2012/0042624 A1 * | 2/2012 | Lohrentz | A01D 45/021 | 56/119 |
| 2012/0291410 A1 * | 11/2012 | Silver | A01D 45/021 | 56/119 |
| 2015/0050108 A1 | 2/2015 | Nurnberg et al. | | |

FOREIGN PATENT DOCUMENTS

| | | |
|---|---|---|
| DE | 7419415 U | 9/1974 |
| EP | 0131853 A1 | 1/1985 |
| EP | 0539745 A1 | 5/1993 |
| JP | H02138916 A | 5/1990 |
| SU | 1683548 A1 | 10/1991 |

* cited by examiner

CROP HEADER STACKED DIVIDER PIVOT LINKAGE

This application claims priority to Belgium Application BE2014/0665 filed Sep. 3, 2014, which is incorporated herein by reference in its entirety.

FIELD OF THE INVENTION

The invention relates to a folding crop header.

BACKGROUND OF THE INVENTION

Folding crop headers are employed in vehicular harvesting machines such as combine harvesters, forage harvesters and various forms of vegetable harvester.

Typically a header includes an in-use horizontally extending platform sometimes called a cutter bar supporting forwardly projecting comb teeth or other crop cutting features. In the case of a conventional grain harvesting machine an elongate, horizontally extending, rotating reel supporting metal or plastic knife blades co-acts with the features of the cutter bar as the harvesting machine advances in a field of crop. This action severs the crop stems and helps convey them inside the harvesting machine for threshing or other separation of valuable crop parts from stems and husks. In other harvesting machines the forwardly projecting features can be powered to rotate or otherwise reciprocate in order to cut crop plants as the harvesting machine moves forwardly.

At either end of the cutter bar the header includes a respective, forwardly projecting crop divider. The crop dividers are triangular plates forwardly projecting apices of which penetrate the rows of crop at either end of the cutter bar as the harvesting machine moves forwardly. The main purpose of the crop dividers is to ensure that crop over the whole width of the cutter bar is captured during harvesting, and there is no wastage caused by crop being pushed sideways away from the cutter bar.

The crop dividers are rigid or only partially flexible and present a potential hazard when the harvesting machines are driven on roads. Moreover in several countries vehicle homologation regulations dictate that items such as crop dividers must project forwardly relative to the steering wheel of a harvester by no more than a defined maximum distance. The crop dividers when in situ may breach this requirement.

In the early days of combine harvester development the crop divider was completely rigid but this led to damage when the crop divider struck e.g. an undulation in the ground.

In order to solve such defects a modern crop divider is partly flexible, and includes a horizontal pivot, defined at a lower edge of the crop divider, that allows pivoting of a front section of the crop divider upwardly relative to the remainder that is fixed to the cutter bar. This permits the crop divider to flex and accommodate undulations. Also the ability of the crop divider to pivot has a beneficial effect on crop flow especially in lodged grain conditions as from time to time arise.

In known combine harvester designs the range of pivoting movement is limited, at least while the header is in use during harvesting operations. Moreover this limited ability to flex does not address the problem, identified above, of the crop divider protruding forwardly further than is allowed in on-road driving situations.

It is an aim of the invention to solve or at least ameliorate one or more problems of the prior art.

SUMMARY OF THE INVENTION

According to the invention in a broad aspect there is provided a folding crop header comprising an articulated, elongate crop divider defining upper and lower crop divider edges and having first and second crop divider sections, the crop divider including at or adjacent a said lower crop divider edge a hinge permitting pivoting of the first and second crop divider sections relative to one another about a first axis at or adjacent the said lower crop divider edge; and the crop divider including at or adjacent a said upper crop divider edge a linkage, the linkage: i) permitting pivoting of the first and second crop divider sections relative to one another about a second axis at or adjacent the said upper crop divider edge; and additionally ii) permitting displacement of the first and second crop divider sections relative to one another in a displacement direction that is skewed relative to the second axis, the hinge being decouplable in order to permit separation of the first and second crop divider sections from one another in the vicinity of the lower crop divider edge.

In a typical embodiment of the invention there is provided a plurality of crop dividers spaced apart over the width of the header, each crop divider being pivotable and foldable in like manner to the second crop divider section described above. Thus an advantage of the invention is that crop divider sections along the lateral width of the header may be folded to stack overlying a fixed crop divider section or a part of the cutter bar, while accommodating a pivoting arrangement that renders the header partly flexible as described. This is because the hinges conferring partial flexibility on the crop divider lie at a lower edge of the header thereby rendering them suitable for absorbing upwardly acting forces as described; and also because the linkage accommodates flexing of the crop dividers during harvesting operations while defining a folding locus that results in a compact arrangement when road driving is required.

In turn this means that a compact header configuration may be achieved without requiring the crop divider sections to protrude forwardly of the cutter bar.

Preferably the first and second axes extend parallel one to the other and the displacement direction extends perpendicular to the first and second axes. This combination of pivot axes advantageously means that the first and second crop divider sections can readily be stacked in a compact manner.

It is further preferable that the crop header includes a release for causing decoupling of the hinge. This means that the hinge may be retained in an integral form during harvesting so as to confer limited flexibility on the crop divider. The sections of the crop divider however may be decoupled at the lower crop divider edge when it is required to fold the header for road transport.

In one embodiment of the invention the release is operable under the influence of impact of at least the second crop divider section with an object that is external to the crop header. This aspect of the invention may operate subject to a detent force provided by e.g. a resiliently deformable member forming part of the release, so that relatively low-magnitude impacts caused by ground undulation do not cause decoupling of the hinge; whereas more severe impacts may give rise to decoupling in order to minimise the risk of damage to the crop divider.

Further preferably the release is manually operable. This allows the driver of a harvester machine to decouple the hinge when it is required to convert the header from a harvesting configuration for on-road driving.

Conveniently the crop header is attached to or forms part of a vehicle including an engine hood; an in-use free end of the second crop divider section includes an apex; and the linkage defines a movement locus of the second crop divider section such that when folded the apex lies adjacent the hood. Such an arrangement permits a harvester including the header of the invention to meet the homologation standards of several countries.

Preferably the linkage includes a pivot pin and an elongate slide in which the pivot pin is rotatably, slideably captive. Other forms of linkage however are possible within the scope of the invention, for example a linkage that includes one or more of rods, levers, pivots, slots or other mechanical components that together define the desired movement locus.

The folding crop header may comprise a bearing on, or a bearing that interacts with a folding header.]

According to a second aspect of the invention there is provided a method of maneuvering a crop header according to the invention including the steps of releasing the release and causing the second crop divider section to pivot relative to the first crop divider section; and additionally causing the second crop divider section to displace relative to the first crop divider section so that the second said section stacks above the first. Such a method confers analogous benefits to those inuring to the header defined herein.

Another method of maneuvering a crop header as defined herein includes in accordance with a further aspect of the invention the steps of moving the second crop divider section from a location in which it is stacked above the first crop divider section by causing the second crop divider section to pivot relative to the first crop divider section and additionally causing the second crop divider section to displace relative to the first crop divider section; and latching the release so that the second crop divider section is retained in a deployed configuration.

BRIEF DESCRIPTION OF THE DRAWINGS

There now follows a description of a preferred embodiment of the invention, by way of non-limiting example, with reference being made to the accompanying drawings in which.

DETAILED DESCRIPTION OF EMBODIMENT(S)

Figure 1:
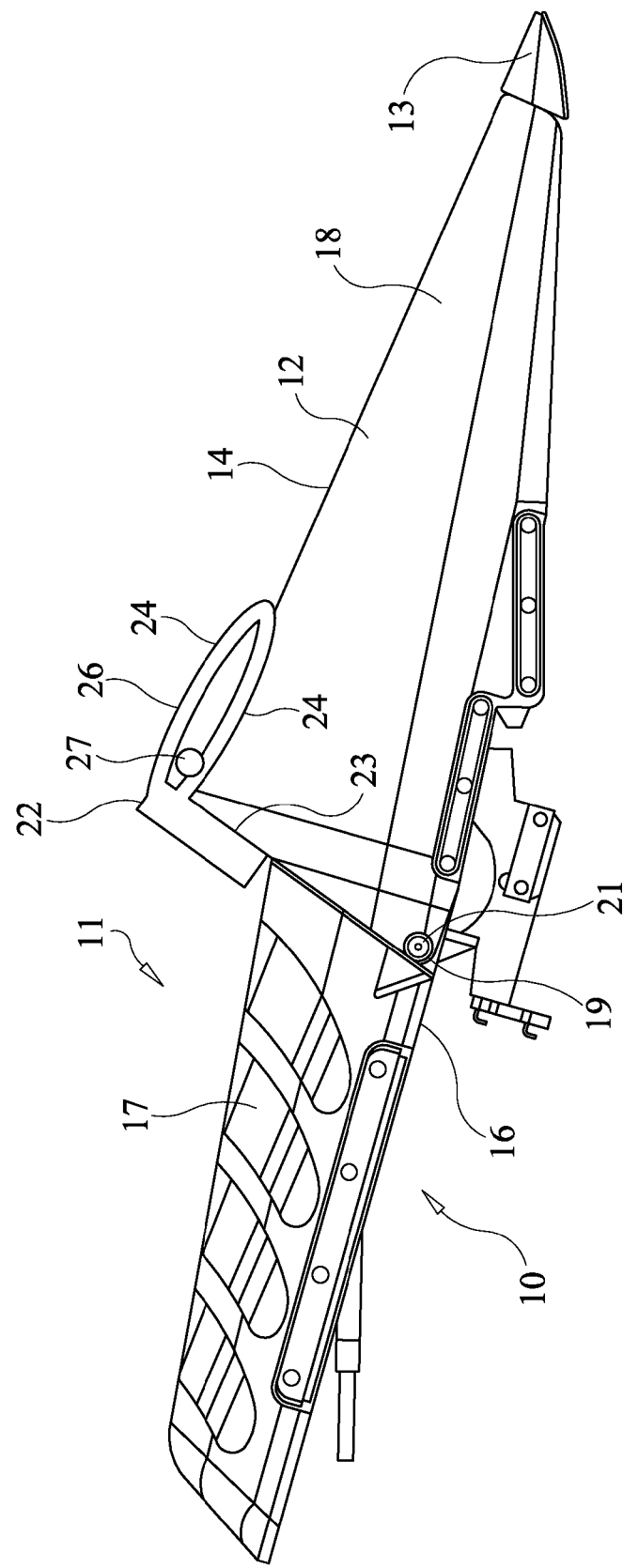
FIG. 1 is a schematic view of part of a header according to the invention, showing the crop divider in an operative (harvesting) position.

Referring to the drawings, a folding crop header 10 includes an articulated, elongate crop divider 11. As is conventional the crop divider 11 includes a triangular plate 12 the apex 13 of which projects forwardly from the header to protrude in front of the crop-gathering part of a harvesting machine. A plurality of crop dividers 11 can be provided across the width of the header such that the crop dividers 11 direct crop to different regions of the header as the harvesting machine moves forwardly during harvesting operations. Alternatively, crop dividers 11 can be provided at each lateral end of the header in order to define a boundary of the width of crop ingested into the harvesting machine.

The harvesting machine per se is omitted from the drawings for ease of explanation. It may be of a range of types, including but not limited to combine harvesters, forage harvesters and vegetable harvesters such as beet harvesters and pea/bean harvesters.

The crop divider 11 defines in-use upper 14 and lower 16 crop divider edges. The lower crop divider edge during harvesting extends normally in a straight line close to the ground being harvested.

The crop divider is divided into first (rear) and second (front) sections 17, 18. First crop divider section 17 is fixed to the header at the rear side of the row units, close to a cross auger for transporting the harvested crop to a feeder opening of the combine harvester to which the header is to be attached. Second crop divider section 18 is, e.g., secured to the forwardmost edge of first crop divider section 17 so as to protrude forwardly from it.

A hinge 19 including a hinge pin 21 is formed in the lower crop divider edge 16, approximately mid-way along its length. Hinge 19 couples the first and second crop divider sections 17, 18 together such that second crop divider section 18 is rotatable relative to first crop divider section 17 about a horizontal (or at least laterally extending) axis defined by the pin 21 of hinge 19.

As a result of this arrangement if during forward motion of the harvesting machine with the crop divider 11 configured as in FIG. 1 the second section 18 contacts e.g. an undulation in the ground, or a large stone, the second crop divider section 18 is capable of pivoting upwardly to accommodate the change in ground height that results.

Such pivoting typically is represented by a pivot angle relative to the normal use position of FIG. 1 of less than 20°.

The crop divider 11 also includes at or adjacent the upper crop divider edge 14 a linkage 22 that is represented entirely schematically in the figures, and that may take a range of forms in practice.

Linkage 22 in the illustrated embodiment of the invention includes a bracket 23 that is secured to first crop divider section 17 extending upwardly adjacent the upper edge 14 thereof. Extending generally perpendicular to bracket 23 is a plate 24 having formed therein an elongate slot 26 that also extends perpendicular to the elongate dimension of the bracket 23.

A linkage pin 27 is secured to second crop divider section 18 adjacent upper edge 14. Linkage pin 27 is captive within slot 26 and is both rotatable in the slot and slideable along the slot 27. The linkage pin 27 may also be referred to as a pivot pin, and the slot 26 may be referred to as an elongate slide.

The arrangement of the slot 26 and linkage pin 27 is such that through longitudinal sliding of the linkage pin 27 along the slot 26 pivoting of the first and second crop divider sections 17, 18 about hinge 19 is accommodated. The ends of the slot 26 define limits of longitudinal sliding motion of the linkage pin 27 with the result that the extent of rotation of the first and second crop divider sections 17, 18 about hinge 19 is limited owing to the rigidity of the components.

The hinge 19 however includes a release mechanism that may take a range of forms as would occur to the person of skill in the art and that permits decoupling of the parts of hinge 19.

The release is such as to separate the parts of the hinge either in the event of the second crop divider section 18 suffering an impact that exceeds the detent force provided by a release detent including one or more resiliently deformable parts; or in the event of the driver of the harvester manually unlatching the release in order to permit folding of the second crop divider section 18 as described below.

FIG. 1 shows the second crop divider section 18 in a position that is near to the extent of its range of rotational movement about the hinge 19 in an anti-clockwise direction relative to the first crop divider section 17. That is, the linkage pin 27 is near to the leftmost end of the slot 26 as it is shown in FIG. 1. In this position, the apex 13 is near its highest position before the release causes the parts of the hinge to be decoupled. It will be appreciated that as the second crop divider section 18 rotates about the hinge 19 in a clockwise direction relative to the first crop divider section 17, the linkage pin 27 will move to the right within the slot 26 and the apex 13 will move downwards.

Figure 2:
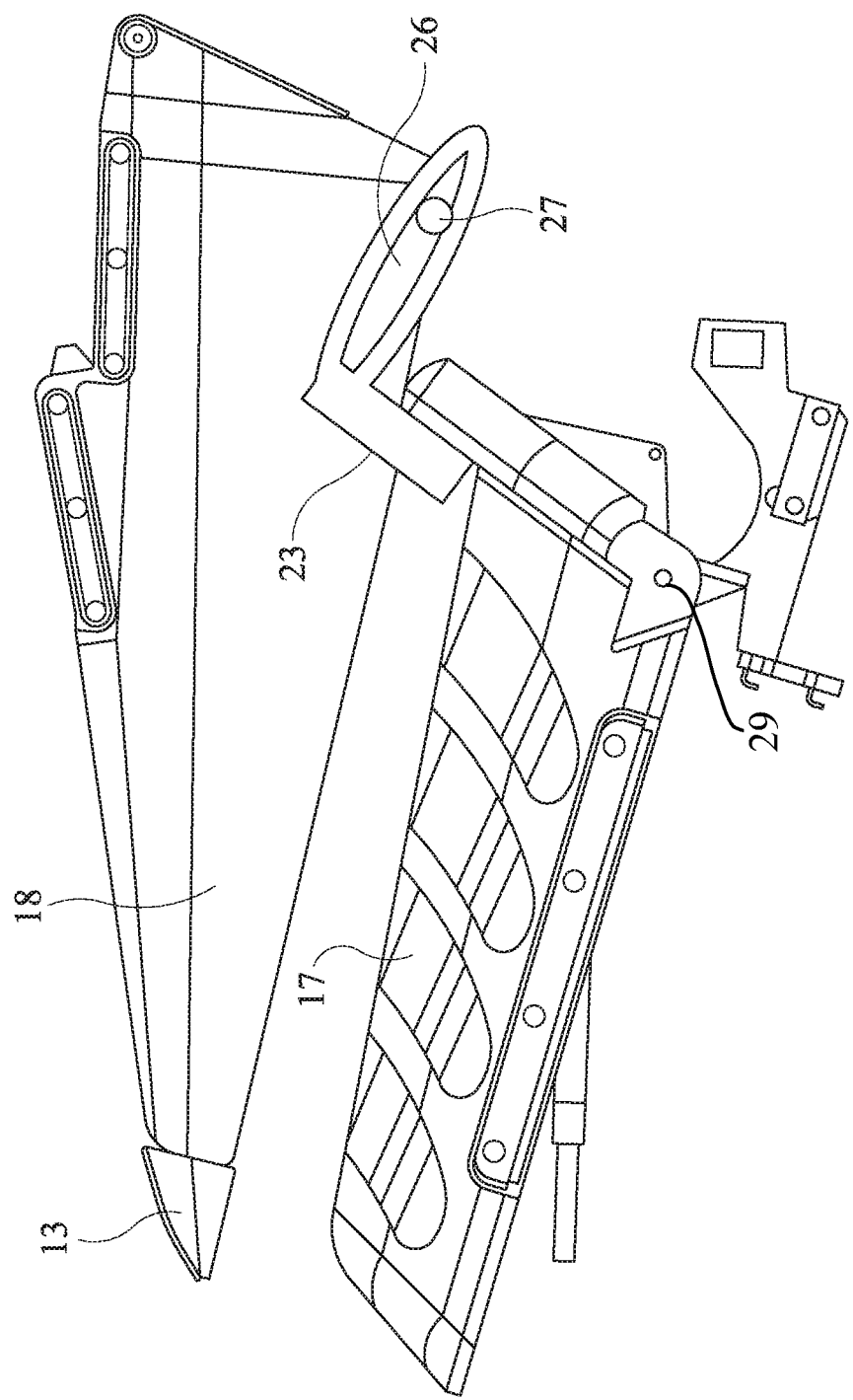
FIG. 2 is a similar view to FIG. 1, showing the crop divider in a transport position that renders a harvesting machine incorporating the header suitable for transport on roads and in confined areas; and c.
Figure 3:
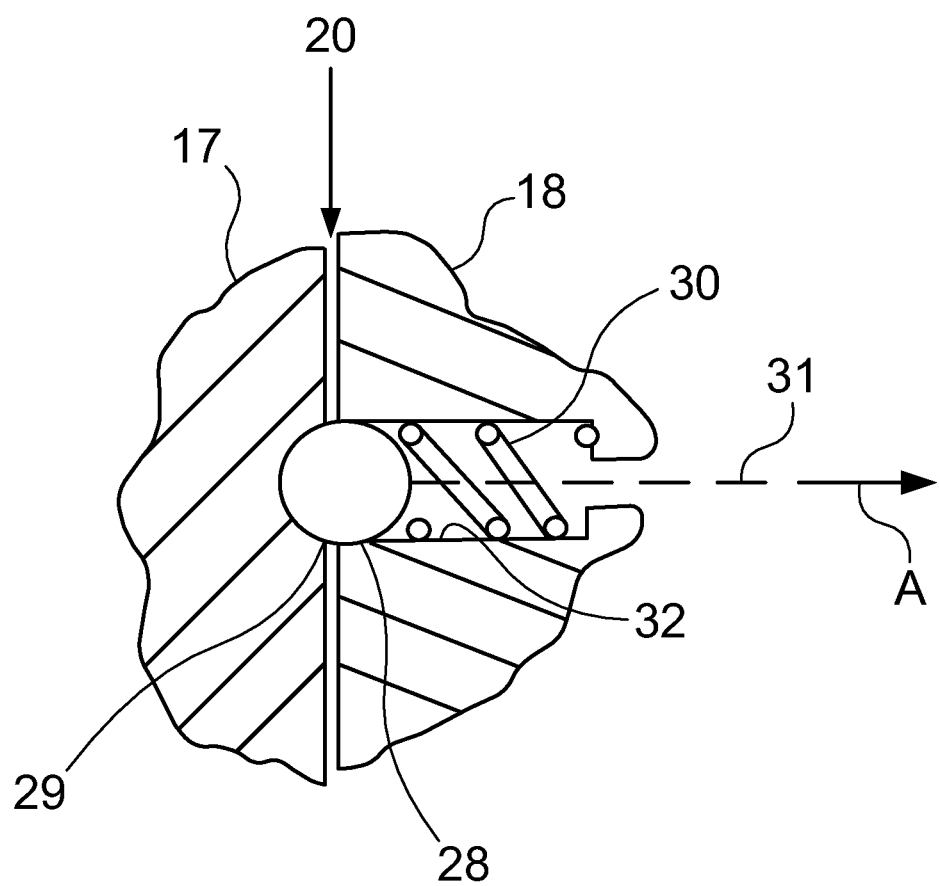
FIG. 3 is a partial fragmentary view of the header of FIGS. 1 & 2 showing an example of a release mechanism.

As noted in FIG. 3, the release mechanism 20 may be such that a significant impact experienced by the second crop divider section 18 is sufficient to unlatch it. To this end the release mechanism 20 may include e.g. one or more spring-biased dowels, balls 28 or other connectors that are received in aligned holes or recesses 29, also shown in FIG. 2 such that forceful movement of the second crop divider section 18 forces the dowels, etc, out of their seatings in the recesses 29 in order to unlatch the release mechanism 20. A spring 30 may act on ball 28 urging it within a bore 32 toward recess 29. A connection 31, shown schematically as a dashed line, enables manual disconnection of release mechanism 20 by pulling ball 28 away from recess 29 in direction A. Many other forms of a release mechanism 20 may be employed.

The release mechanism also may include e.g. one or more operator handles for the purpose of manually causing disengagement of spring-loaded, engageable parts, that otherwise normally maintain the release mechanism in a latched condition.

Following unlatching of the release mechanism the hinge 19 is inoperative and at lower crop dividers edge 16 the first and second crop divider sections 17, 18 are mutually disconnected. The first and second crop divider sections 17, 18 however remain connected together at the upper crop divider edge 14, by reason of the linkage plate 24, slot 26 and linkage pin 27.

This permits movement of the second crop divider section 18 relative to the first said section 17 according to a locus that is a mix of rotation of the linkage pin 27 in the slot 26, and sliding of the linkage pin along the slot 26.

This is summarised in FIG. 2, from which it is apparent that movement of the second crop divider portion 18 along this locus the apex 13 is inverted, "doubled back" to point towards the main body of the harvester, and orientated so as to overlie the first crop divider section 17. Movement as aforesaid results in the linkage pin 27 travelling from a first end of the slot 26, adjacent the bracket 23, to lie at the opposite end of the slot 26.

This is a neat, compact arrangement that permits on-road driving of the harvester. The furthest protruding part of the crop divider satisfies homologation regulations regarding the proximity of external parts to the vehicle steering wheel. This may be defined by reference to the apex 13 in the folded condition lying adjacent the engine hood that is a conventional part of the bodywork of a harvesting vehicle.

Overall the apparatus of the invention provides the ability to fold a crop divider without sacrificing the ability of the crop divider to pivot at its lower edge while in use in a field.

The invention additionally relates to a method of folding a crop divider as described, and to a reverse process in which the crop divider is deployed from the folded configuration in FIG. 2 to the operative condition shown in FIG. 1.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A folding crop header comprising:
   an articulated, elongate crop divider defining upper and lower crop divider edges and comprising first and second crop divider sections, the crop divider further comprising at or adjacent the lower crop divider edge a releasable hinge permitting pivoting of the first and second crop divider sections relative to one another about a first axis at or adjacent the lower crop divider edge; and
   the crop divider further comprising at or adjacent the upper crop divider edge a linkage, the linkage comprising:
   a pin with a pivotal axis permitting pivoting of the first and second crop divider sections relative to one another about a second axis at or adjacent the upper crop divider edge between a first position in which the first and second crop divider sections are arranged end-to-end and a second position in which the second crop divider section is arranged on top of the first crop divider section; and
   an elongate slide in which the pin is slidably disposed for displacement of the second pivotal axis and the first and second crop divider sections relative to one another in a direction perpendicular relative to the second pivotal axis,
   wherein the hinge is releasable in order to permit separation of the first and second crop divider sections from one another in the vicinity of the lower crop divider edge.

2. The crop header according to claim 1, wherein the first and second axes extend parallel one to the other.

3. The crop header according to claim 1, wherein the hinge has a release mechanism.

4. The crop header according to claim 3, wherein the release mechanism is operable under the influence of impact on at least the second crop divider.

5. The crop header according to claim 3, wherein the release mechanism is manually operable.

6. The crop header according to claim 1, wherein the elongate slide is an elongate slot in which the pivot pin is rotatably, slideably captive.

7. The crop header according to claim 3, wherein the release mechanism comprises a recess on one of the first and second crop divider sections at the hinge and a ball on the other of the first and second crop divider sections yieldably urged toward the recess.

8. The crop header according to claim 7, further comprising a spring for urging the ball toward the recess.

9. The crop header according to claim 7, further comprising a connection to the ball for displacing it away from the recess.

\* \* \* \* \*